Feb. 13, 1940.   C. H. SMALLWOOD ET AL   2,190,370
TRACTION WHEEL RIM
Filed Nov. 14, 1938
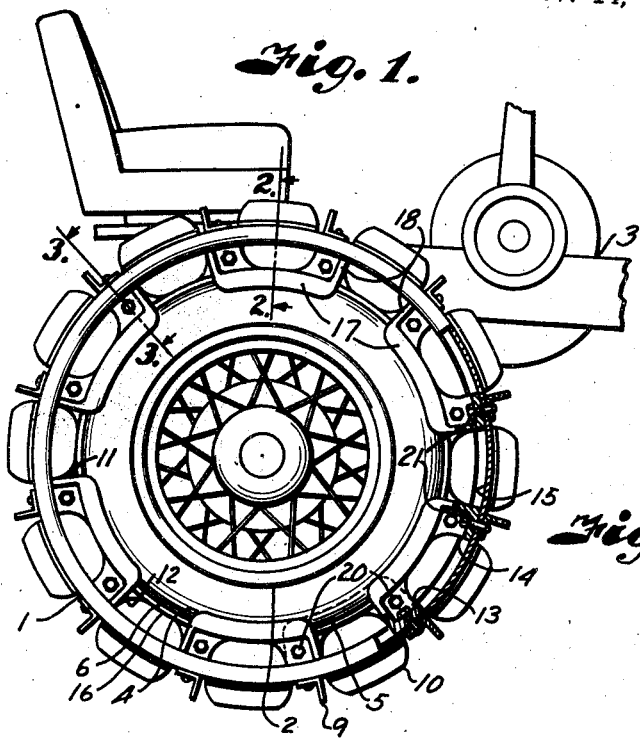
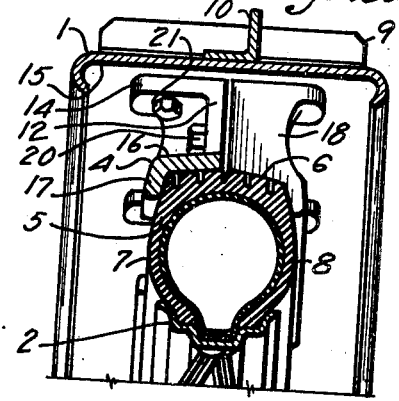
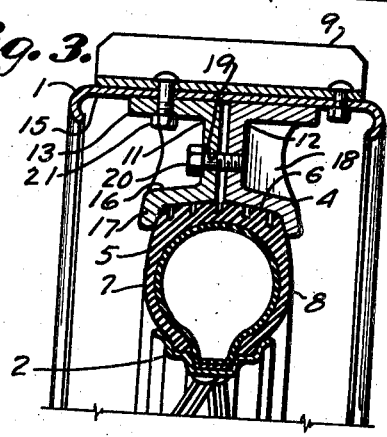
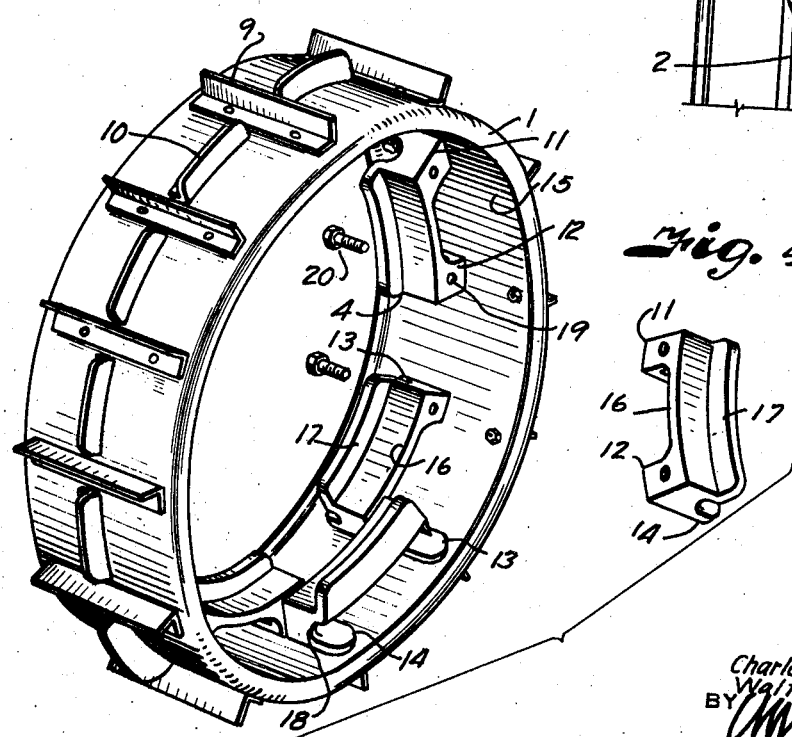
INVENTORS
Charles H. Smallwood, and
Walter A. Reich.
BY
ATTORNEY Patented Feb. 13, 1940

2,190,370

UNITED STATES PATENT OFFICE 2,190,370

TRACTION WHEEL RIM

Charles H. Smallwood, Brownington, and Walter A. Reich, Kansas City, Mo.

Application November 14, 1938, Serial No. 240,273

8 Claims. (Cl. 152—56)

This invention relates to traction wheel rims and more particularly to rims of that character adapted for removable mounting on the tires of tractor and like traction wheels.

Pneumatic and like tires are customarily employed to cushion the normally rearwardly positioned traction wheels and the normally forwardly positioned guide wheels of tractors used for heavy road duty in order to comply with the laws of many states prohibiting the use of tractors having lugged wheels on state or county roads. When, however, the tractors are to be used on farm and like land for heavy work, it has been found that insufficient traction is obtained from the pneumatic tires to obtain efficient service from the tractor.

It is, therefore, the principal object of the present invention to provide a low cost demountable rim that may be readily applied to old or new pneumatic tires of tractor traction wheels to the end that the tractor may be driven on roads in a manner complying with law and may be driven on land proper in a manner by which the efficiency of the tractor is augmented.

Other objects of the invention are to provide for seating the traction wheels for the tractor internally of the rim; to provide for adjusting the rim and rim-engaged tires relative to each other for increasing or decreasing the bite and/or frictional engagement therebetween; to provide a minimum number of tire engaging elements capable of efficiently fixing the rims on the tires; to provide for quickly and easily applying and removing the rims relative to the tires; and to provide improved parts and combinations of parts in the construction of rims having the purposes and objects above set forth.

In accomplishing these and other objects of the present invention, we have provided improved details of structure, the preferred form of which is illustrated in the accompanying drawing, wherein:

Fig. 1 is a fragmentary side elevational view of a conventional tractor or like vehicle, the rear traction wheels of which are provided with rims embodying the features of the present invention, portions of the rim being shown in section to better illustrate the construction.

Fig. 2 is a detail vertical cross-sectional view through a portion of the rim and tire on the line 2—2, Fig. 1.

Fig. 3 is a section similar to Fig. 2 on the line 3—3, Fig. 1.

Fig. 4 is a detail perspective view of the rim embodying the present invention, a tire saddle portion thereof being shown in disassembled spaced relation thereto to show the manner of attachment thereof to the rim.

Referring more in detail to the drawing:

The invention preferably includes a rim 1 designed for application to each of the traction wheels 2 of a tractor 3 or the like by means of saddles 4, fixed internally relative to the rim 1 and engageable with spaced surface portions of tires 5 on the traction wheels in such a manner as to removably mount the rims about the wheels and upon the tires.

The tractor 3 is conventional, as are the wheels 2 and tires 5, the tires preferably being of pneumatic type having the usual tread 6 and side walls 7 and 8.

When employing the tractor on farm land or rough terrain in comparison to relatively smooth road surfaces, a rim 1 is preferably applied to each of the traction wheels of the tractor.

Each rim 1 preferably includes a circular band of metal of substantially greater diameter than the wheel and tire to which it is to be applied, the outer surface of the rim having spaced transverse angle irons suitably fixed to the rim and forming traction lugs 9. Spaced, annularly disposed, arcuately shaped angle irons are also preferably arranged between the traction lugs and form guide lugs 10 to prevent side slipping of the tractor.

The saddles 4 are substantial duplicates, each preferably including spaced bosses 11 and 12 having laterally extending base flanges 13 and 14, frictionally engageable with the inner face 15 of the rim. The bosses 11 and 12 are joined by an arcuate flange 16 frictionally engageable with the tread 6 of each of the tires 5. A side flange 17 is preferably formed integrally with the flange 16 and is adapted for frictional engagement with one of the side walls of the tire 5, the ends of the side flange 17 being joined to the adjacent bosses and base flanges by end closures 18.

It has been found preferable to arrange alternate saddles 4 in overlapping, oppositely disposed, annular series relation, as particularly shown in Fig. 4, and to this end the bosses 11 and 12 are bored transversely, as at 19, to provide for passing fastening devices 20 therethrough to connect the saddles together, the boss 11 of one saddle being positioned adjacent the boss 11 of another saddle when in oppositely disposed relation, as shown in Fig. 4.

In order to secure the saddles to the rim it has been found preferable to provide the base flanges of one series of similarly arranged saddles with apertures alignable with spaced, annularly arranged apertures in the rim for the passage of fastening devices 21 to fix one series of saddles to the rim, the oppositely disposed series of saddles being fixed to the rim indirectly by the fastening devices 20, yet having frictional bearing support on the inner face of the rim.

In using a rim constructed as described, and assuming that the rim is to be applied to a traction wheel having a pneumatic tire, the wheel may be "jacked-up" in a suitable manner and, if desired, the tire may be partially deflated. Certain of the fastening devices 20 may then be loosened to permit removal of certain adjacent saddles in a series thereof frictionally engaging the rim, it being unnecessary to remove all of that series of saddles, and the rim may then be placed over the tire 5, the flanges 16 of the saddles engaging the tread of the tire 5 and the flanges 17 of the fixed series of saddles engaging opposite surface portions of the side walls of the tire. The removed saddles are then replaced in engaged relation to the tread and one side wall of the tire and the tire may then be inflated to enhance engagement thereof by the saddles.

It will be noted with particular reference to Fig. 3 that the arrangement of the oppositely disposed saddles is such that the adjacent bosses 11 and 12 of each saddle are spaced laterally from each other to provide for adjustment relative to the tire by means of the fastening devices 20 when it is desired to increase or decrease frictional engagement or bite in fixing the rim to the tire.

Particular advantages resulting from the present invention are that inflation of the tire to which the rim is attached is normally sufficient to fix the tire in the saddles and the rim on the tire. The rim is easily and quickly applied to the tire without the necessity of removing all the saddles of even one series. The interengagement of the saddles adapts the oppositely disposed series thereof to be pulled together to grip the tire. It is also apparent that no tie members or other extraneous elements are necessary to secure the rim to the tire and traction wheel.

What we claim and desire to secure by Letters Patent is:

1. In a device of the character described, a rim, and a plurality of saddles mounted interiorly of the rim in alternate oppositely disposed relation to each other to seat a tire between portions thereof and frictionally retain the rim thereon.

2. In a rim of the character described, substantially duplicate saddle members mounted interiorly of the rim, each saddle member including base members engageable with the rim, an arcuate member connecting the base members, the arcuate member being spaced inwardly from the rim and being frictionally engageable with the tread of a tire, and a side flange on said arcuate member engageable with a side wall of the tire.

3. In a rim of the character described, substantially duplicate saddles mounted interiorly of the rim, each saddle including base members engageable with the rim, an arcuate member connecting the base members, the arcuate member being spaced inwardly from the rim and being frictionally engageable with the tread of a tire, and a side flange on said arcuate member engageable with a side wall of the tire, said saddles being arranged in alternately oppositely disposed annular series about the interior of the rim.

4. In a device of the character described, a rim, and saddles mounted interiorly of the rim adapted to seat a tire and frictionally retain the rim thereon, said saddles being arranged in alternately, oppositely disposed annular series about the interior of the rim.

5. In a rim of the character described, substantially duplicate saddle members mounted interiorly of the rim, each saddle member including base members engageable with the rim, an arcuate member connecting the base members, the arcuate member being spaced inwardly from the rim and being frictionally engageable with the tread of a tire, and a side flange on said arcuate member engageable with a side wall of the tire, said saddles being arranged in alternately oppositely disposed annular series about the interior of the rim, one series of said saddles being fixed to said rim, the other series of said saddles being adjustably connected to said fixed series.

6. In a rim of the character described, substantially duplicate saddles mounted interiorly of the rim, each saddle including base members engageable with the rim, an arcuate member connecting the base members, the arcuate member being spaced inwardly from the rim and being frictionally engageable with the tread of a tire, a side flange on said arcuate member engageable with a side wall of the tire, said saddles being arranged in alternately, oppositely disposed annular series about the interior of the rim, the base members of one series of saddles being fixed to said rim, each of said base members having alignable apertures, and fastening devices extending through said apertures when the base members of alternate saddles are in overlapping relation adapted to laterally adjustably connect said saddles together.

7. In a device of the character described, a rim, and a plurality of saddles mounted interiorly of the rim in alternate oppositely disposed relation to each other to seat a tire between portions thereof and frictionally retain the rim thereon, certain of said saddles being removably engaged with others of the saddles to facilitate application of the rim to the tire.

8. In a rim of the character described, saddles mounted interiorly of the rim, certain of said saddles being fixed to said rim, the others of said saddles being connected to said fixed saddles.

CHARLES H. SMALLWOOD.
WALTER A. REICH.